US008852546B2

(12) United States Patent
Keshavan et al.

(10) Patent No.: US 8,852,546 B2
(45) Date of Patent: *Oct. 7, 2014

(54) POLYCRYSTALLINE DIAMOND MATERIALS HAVING IMPROVED ABRASION RESISTANCE, THERMAL STABILITY AND IMPACT RESISTANCE

(71) Applicant: Smith International, Inc., Houston, TX (US)

(72) Inventors: Madapusi K. Keshavan, The Woodlands, TX (US); Youhe Zhang, Tomball, TX (US); Yuelin Shen, Houston, TX (US); Anthony Griffo, The Woodlands, TX (US); Michael Janssen, Spring, TX (US)

(73) Assignee: Smith International, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/676,070

(22) Filed: Nov. 13, 2012

(65) Prior Publication Data

US 2013/0067827 A1  Mar. 21, 2013

Related U.S. Application Data

(63) Continuation of application No. 12/352,516, filed on Jan. 12, 2009, now Pat. No. 8,309,050, which is a continuation of application No. 11/140,615, filed on May 26, 2005, now Pat. No. 7,493,973.

(51) Int. Cl.
 *E21B 10/00* (2006.01)
 *E21B 10/36* (2006.01)
 (Continued)

(52) U.S. Cl.
 CPC .............. *B01J 3/06* (2013.01); *B01J 2203/062* (2013.01); *B01J 2203/0685* (2013.01);
 (Continued)

(58) Field of Classification Search
 None
 See application file for complete search history.

(56) References Cited

U.S. PATENT DOCUMENTS 2,941,241 A  6/1960  Strong
2,941,248 A  6/1960  Hall
(Continued)

FOREIGN PATENT DOCUMENTS

EP  0028106 A1  5/1981
EP  0 196 777 A1  10/1986
(Continued)

OTHER PUBLICATIONS

Pleskov et al.; Vacuum-Annealed Undoped Polycrystalline Diamond: a New Electrode Material; Russian Journal of Electrochemistry; vol. 39, Issue 7, pp. 802-807; Jul. 2003.*
(Continued)

*Primary Examiner* — Guinever Gregorio
(74) *Attorney, Agent, or Firm* — Snell & Wilmer L.L.P.

(57) ABSTRACT

PCD materials comprise a diamond body having bonded diamond crystals and interstitial regions disposed among the crystals. The diamond body is formed from diamond grains and a catalyst material at high pressure/high temperature conditions. The diamond grains have an average particle size of about 0.03 mm or greater. At least a portion of the diamond body has a high diamond volume content of greater than about 93 percent by volume. The entire diamond body can comprise high volume content diamond or a region of the diamond body can comprise the high volume content diamond. The diamond body includes a working surface, a first region substantially free of the catalyst material, and a second region that includes the catalyst material. At least a portion of the first region extends from the working surface to depth of from about 0.01 to about 0.1 mm.

17 Claims, 8 Drawing Sheets

(51) Int. Cl.
*B24D 3/02* (2006.01)
*B01J 3/06* (2006.01)
*E21B 10/567* (2006.01)
*C01B 31/06* (2006.01)

(52) U.S. Cl.
CPC ............... B01J 3/062 (2013.01); *E21B 10/567* (2013.01); *B01J 2203/0655* (2013.01); *C01B 31/06* (2013.01)
USPC ........... 423/446; 175/374; 175/426; 175/428; 175/434; 175/425; 175/327; 428/408; 51/309

(56) References Cited

U.S. PATENT DOCUMENTS

| | | | |
|---|---|---|---|
| 2,947,611 A | 8/1960 | Bundy | |
| 3,136,615 A | 6/1964 | Bovenkerk et al. | |
| 3,141,746 A | 7/1964 | Lai | |
| 3,233,988 A | 2/1966 | Wentorf, Jr. et al. | |
| 3,574,580 A * | 4/1971 | Stromberg et al. | 51/307 |
| 3,609,818 A | 10/1971 | Wentorf, Jr. | |
| 3,745,623 A | 7/1973 | Wentorf, Jr. et al. | |
| 3,767,371 A | 10/1973 | Wentorf, Jr. et al. | |
| 3,913,280 A | 10/1975 | Hall | |
| 4,104,344 A | 8/1978 | Pope et al. | |
| 4,108,614 A | 8/1978 | Mitchell | |
| 4,151,686 A | 5/1979 | Lee et al. | |
| 4,224,380 A | 9/1980 | Bovenkerk et al. | |
| 4,255,165 A | 3/1981 | Dennis et al. | |
| 4,268,276 A | 5/1981 | Bovenkerk | |
| 4,288,248 A | 9/1981 | Bovenkerk et al. | |
| 4,289,503 A | 9/1981 | Corrigan | |
| 4,303,442 A | 12/1981 | Hara et al. | |
| 4,311,490 A | 1/1982 | Bovenkerk et al. | |
| 4,370,149 A | 1/1983 | Hara et al. | |
| 4,373,593 A | 2/1983 | Phaal et al. | |
| 4,387,287 A | 6/1983 | Marazzi | |
| 4,403,015 A | 9/1983 | Nakai et al. | |
| 4,412,980 A | 11/1983 | Tsuji et al. | |
| 4,481,016 A | 11/1984 | Campbell et al. | |
| 4,486,286 A | 12/1984 | Lewin et al. | |
| 4,504,519 A | 3/1985 | Zelez | |
| 4,505,746 A | 3/1985 | Nakai et al. | |
| 4,522,633 A | 6/1985 | Dyer | |
| 4,525,179 A | 6/1985 | Gigl | |
| 4,534,773 A | 8/1985 | Phaal et al. | |
| 4,556,403 A | 12/1985 | Almond et al. | |
| 4,560,014 A | 12/1985 | Geczy | |
| 4,570,726 A | 2/1986 | Hall | |
| 4,572,722 A | 2/1986 | Dyer | |
| 4,604,106 A | 8/1986 | Hall | |
| 4,605,343 A | 8/1986 | Hibbs, Jr. et al. | |
| 4,606,738 A | 8/1986 | Hayden | |
| 4,610,699 A * | 9/1986 | Yazu et al. | 51/309 |
| 4,621,031 A | 11/1986 | Scruggs | |
| 4,636,253 A * | 1/1987 | Nakai et al. | 75/239 |
| 4,645,977 A | 2/1987 | Kurokawa et al. | |
| 4,662,348 A | 5/1987 | Hall et al. | |
| 4,664,705 A | 5/1987 | Horton et al. | |
| 4,670,025 A | 6/1987 | Pipkin | |
| 4,673,414 A | 6/1987 | Lavens et al. | |
| 4,707,384 A | 11/1987 | Schachner et al. | |
| 4,726,718 A | 2/1988 | Meskin et al. | |
| 4,766,040 A | 8/1988 | Hillert et al. | |
| 4,772,524 A | 9/1988 | Coblenz | |
| 4,776,861 A | 10/1988 | Frushour | |
| 4,784,023 A | 11/1988 | Dennis | |
| 4,792,001 A | 12/1988 | Zijsling | |
| 4,793,828 A | 12/1988 | Burnand | |
| 4,797,241 A | 1/1989 | Peterson et al. | |
| 4,802,539 A | 2/1989 | Hall et al. | |
| 4,807,402 A | 2/1989 | Rai | |
| 4,828,582 A | 5/1989 | Frushour | |
| 4,844,185 A | 7/1989 | Newton, Jr. et al. | |
| 4,850,523 A | 7/1989 | Slutz | |
| 4,854,405 A | 8/1989 | Stroud | |
| 4,861,350 A | 8/1989 | Phaal et al. | |
| 4,871,377 A | 10/1989 | Frushour | |
| 4,899,922 A | 2/1990 | Slutz et al. | |
| 4,919,220 A | 4/1990 | Fuller et al. | |
| 4,940,180 A | 7/1990 | Martell | |
| 4,943,448 A | 7/1990 | Lacourciere | |
| 4,943,488 A | 7/1990 | Sung et al. | |
| 4,944,772 A | 7/1990 | Cho | |
| 4,954,139 A | 9/1990 | Cerutti | |
| 4,959,929 A | 10/1990 | Burnand et al. | |
| 4,976,324 A | 12/1990 | Tibbitts | |
| 5,011,514 A | 4/1991 | Cho et al. | |
| 5,027,912 A | 7/1991 | Juergens | |
| 5,030,276 A | 7/1991 | Sung et al. | |
| 5,092,687 A | 3/1992 | Hall | |
| 5,096,465 A | 3/1992 | Chen et al. | |
| 5,116,568 A | 5/1992 | Sung et al. | |
| 5,120,495 A | 6/1992 | Supan et al. | |
| 5,127,923 A | 7/1992 | Bunting et al. | |
| 5,135,061 A | 8/1992 | Newton, Jr. | |
| 5,176,720 A | 1/1993 | Martell et al. | |
| 5,186,268 A | 2/1993 | Clegg | |
| 5,186,725 A | 2/1993 | Martell et al. | |
| 5,199,832 A | 4/1993 | Meskin et al. | |
| 5,205,684 A | 4/1993 | Meskin et al. | |
| 5,213,248 A | 5/1993 | Horton et al. | |
| 5,238,074 A | 8/1993 | Tibbitts et al. | |
| 5,264,283 A | 11/1993 | Waldenstrom et al. | |
| 5,337,844 A | 8/1994 | Tibbitts | |
| 5,354,155 A | 10/1994 | Adams | |
| 5,355,969 A | 10/1994 | Hardy et al. | |
| 5,370,195 A | 12/1994 | Keshavan et al. | |
| 5,379,853 A | 1/1995 | Lockwood et al. | |
| 5,419,868 A | 5/1995 | Honnorat | |
| 5,439,492 A | 8/1995 | Anthony et al. | |
| 5,464,068 A | 11/1995 | Najafi-Sani | |
| 5,468,268 A | 11/1995 | Tank et al. | |
| 5,492,186 A | 2/1996 | Overstreet et al. | |
| 5,494,477 A | 2/1996 | Flood et al. | |
| 5,496,638 A | 3/1996 | Waldenstrom et al. | |
| 5,505,748 A | 4/1996 | Tank et al. | |
| 5,510,193 A | 4/1996 | Cerutti et al. | |
| 5,523,121 A | 6/1996 | Anthony et al. | |
| 5,524,719 A | 6/1996 | Dennis | |
| 5,560,716 A | 10/1996 | Tank et al. | |
| 5,603,070 A | 2/1997 | Cerutti et al. | |
| 5,607,024 A | 3/1997 | Keith et al. | |
| 5,620,382 A | 4/1997 | Cho et al. | |
| 5,624,068 A | 4/1997 | Waldenstrom et al. | |
| 5,645,617 A | 7/1997 | Frushour | |
| 5,645,781 A | 7/1997 | Popovic' et al. | |
| 5,662,720 A | 9/1997 | O'Tighearnaigh | |
| 5,667,028 A | 9/1997 | Truax et al. | |
| 5,718,736 A | 2/1998 | Onishi et al. | |
| 5,718,948 A | 2/1998 | Ederyd et al. | |
| 5,722,497 A | 3/1998 | Gum et al. | |
| 5,722,499 A | 3/1998 | Nguyen et al. | |
| 5,776,615 A | 7/1998 | Wong et al. | |
| 5,833,021 A | 11/1998 | Mensa-Wilmot et al. | |
| 5,853,873 A | 12/1998 | Kukino et al. | |
| 5,855,996 A | 1/1999 | Corrigan et al. | |
| 5,875,862 A | 3/1999 | Jurewicz et al. | |
| 5,887,580 A | 3/1999 | Eyre | |
| 5,889,219 A | 3/1999 | Moriguchi et al. | |
| 5,897,942 A | 4/1999 | Karner et al. | |
| 5,954,147 A | 9/1999 | Overstreet et al. | |
| 5,979,578 A | 11/1999 | Packer | |
| 6,009,963 A | 1/2000 | Chaves et al. | |
| 6,041,875 A | 3/2000 | Rai et al. | |
| 6,054,693 A | 4/2000 | Barmatz et al. | |
| 6,063,333 A | 5/2000 | Dennis | |
| 6,063,502 A | 5/2000 | Sue et al. | |
| 6,098,730 A | 8/2000 | Scott et al. | |
| 6,123,612 A | 9/2000 | Goers | |
| 6,126,741 A | 10/2000 | Jones et al. | |
| 6,132,675 A | 10/2000 | Corrigan et al. | |
| 6,193,001 B1 | 2/2001 | Eyre et al. | |
| 6,216,805 B1 | 4/2001 | Lays et al. | |

(56) References Cited

U.S. PATENT DOCUMENTS

| | | |
|---|---|---|
| 6,234,261 B1 | 5/2001 | Evans et al. |
| 6,248,447 B1 | 6/2001 | Griffin et al. |
| 6,258,139 B1 | 7/2001 | Jensen |
| 6,261,329 B1 | 7/2001 | Ogata et al. |
| 6,269,894 B1 | 8/2001 | Griffin |
| 6,315,065 B1 | 11/2001 | Yong et al. |
| 6,332,503 B1 | 12/2001 | Pessier et al. |
| 6,344,149 B1 | 2/2002 | Oles |
| 6,367,568 B2 | 4/2002 | Steinke et al. |
| 6,410,085 B1 | 6/2002 | Griffin et al. |
| 6,432,150 B1 | 8/2002 | Levashov et al. |
| 6,435,058 B1 | 8/2002 | Matthias et al. |
| 6,443,248 B2 | 9/2002 | Yong et al. |
| 6,544,308 B2 * | 4/2003 | Griffin et al. .................. 51/309 |
| 6,550,556 B2 | 4/2003 | Middlemiss et al. |
| 6,592,985 B2 | 7/2003 | Griffin et al. |
| 6,601,662 B2 | 8/2003 | Matthias et al. |
| 6,797,326 B2 | 9/2004 | Griffin et al. |
| 6,892,836 B1 | 5/2005 | Eyre et al. |
| 6,904,984 B1 | 6/2005 | Estes et al. |
| 6,935,444 B2 | 8/2005 | Lund et al. |
| 6,951,578 B1 | 10/2005 | Belnap et al. |
| 6,991,049 B2 | 1/2006 | Eyre et al. |
| 7,350,601 B2 | 4/2008 | Belnap et al. |
| 7,506,698 B2 | 3/2009 | Eyre et al. |
| 2002/0071729 A1 | 6/2002 | Middlemiss et al. |
| 2003/0021995 A1 | 1/2003 | Griffin et al. |
| 2003/0235691 A1 | 12/2003 | Griffin et al. |
| 2005/0139397 A1 | 6/2005 | Achilles et al. |
| 2005/0230156 A1 | 10/2005 | Belnap et al. |
| 2005/0263328 A1 * | 12/2005 | Middlemiss .................. 175/434 |
| 2006/0060390 A1 | 3/2006 | Eyre |
| 2006/0060391 A1 | 3/2006 | Eyre et al. |
| 2006/0162969 A1 | 7/2006 | Belnap et al. |
| 2006/0266558 A1 | 11/2006 | Middlemiss et al. |
| 2007/0029114 A1 * | 2/2007 | Middlemiss .................. 175/374 |
| 2007/0039762 A1 | 2/2007 | Achilles |
| 2007/0181348 A1 | 8/2007 | Lancaster et al. |
| 2007/0187155 A1 | 8/2007 | Middlemiss |
| 2008/0178535 A1 | 7/2008 | Wan |
| 2009/0095538 A1 * | 4/2009 | Middlemiss .................. 175/432 |
| 2010/0166635 A1 * | 7/2010 | Sung .......................... 423/446 |
| 2010/0236836 A1 * | 9/2010 | Voronin ....................... 175/426 |
| 2011/0139514 A1 * | 6/2011 | Voronin et al. ............... 175/428 |
| 2011/0258937 A1 * | 10/2011 | Qian et al. ..................... 51/297 |

FOREIGN PATENT DOCUMENTS

| | | |
|---|---|---|
| EP | 0272913 A2 | 6/1988 |
| EP | 0300699 A2 | 1/1989 |
| EP | 0329954 A2 | 8/1989 |
| EP | 0352811 A1 | 1/1990 |
| EP | 0500253 A1 | 8/1992 |
| EP | 0511253 A1 | 11/1992 |
| EP | 0585631 A1 | 3/1994 |
| EP | 0595630 A1 | 5/1994 |
| EP | 0612868 A1 | 8/1994 |
| EP | 0617207 A2 | 9/1994 |
| EP | 0706981 A2 | 4/1996 |
| EP | 0787820 A2 | 8/1997 |
| EP | 0860515 A1 | 8/1998 |
| EP | 1190791 A2 | 3/2002 |
| GB | 1349385 A | 4/1974 |
| GB | 1572460 A | 7/1980 |
| GB | 2048927 A | 12/1980 |
| GB | 2261894 A | 6/1993 |
| GB | 2268768 A | 1/1994 |
| GB | 2270492 A | 3/1994 |
| GB | 2315778 A | 2/1998 |
| GB | 2323398 A | 9/1998 |
| GB | 2418215 A | 3/2006 |
| GB | 2422394 A | 7/2006 |
| RU | 2034937 C1 | 5/1995 |
| RU | 566439 | 1/2000 |
| WO | 9323204 A1 | 11/1993 |
| WO | 9634131 A1 | 10/1996 |
| WO | 0028106 A1 | 5/2000 |
| WO | 2004040095 A1 | 5/2004 |
| WO | 2004106003 A1 | 12/2004 |
| WO | 2004106004 A1 | 12/2004 |

OTHER PUBLICATIONS

Translation of Japanese Unexamined Patent Application No. S59-218500. "Diamond Sintering and Processing Method,"Shuji Yatuse and Tetsuo Nakai, inventors; Application published Dec. 10, 1984; Applicant: Sumitomo Electric Industries Co. Ltd. Office Action by UPSTO mailed Mar. 11, 2003 for related U.S. Appl. No. 10/065,604.
Combined Search and Examination Report of corresponding British Patent Application No. GB0823390.0 dated Apr. 7, 2009, total 5 pages.
Combined Search and Examination Report under Sections 17 & 18(3) issued in corresponding British Patent Application No. GB0610430.1 dated May 26, 2008; 3 pages.
Search and Examination Report under sections 17 & 18(3) issued in corresponding British Patent Application No. GB0610430.1 dated Aug. 5, 2008; 4 pages.
Matrice Technology; Flaw Tolerant, Fracture Resistant, Non-Brittle Materials Produced via Conventional Powder Processing; Materials Technology; vol. 10, Nos. 7-8; Jul.-Aug. 1995; Issn 1066-7587; pp. 131-134.
Advanced Ceramics Research; Fibrous Monolithic Processing Technology; May 24, 1995; 3 pages.
Advanced Ceramics Research; Solid Free-Body Forming/ Rapid Prototyping; May 24, 1995; 2 pages.
Advanced Ceramics Research; Research & Development Summaries; Aug. 18, 1995; 2 pages.
Advanced Cermaics Research; Functional Gradient Materials; Feb. 26, 1996; 2 pages.
Radtke et al.; Faster Drilling, Longer Life: Thermally Stable Diamond Drill Bit Cutters, GasTIPS; Summer 2004; pp. 5-9.
Non-Final Office Action in U.S. Appl. No. 12/352,516 dated Aug. 6, 2010, total 50 pages.
Final Office Action in U.S. Appl. No. 12/352,516 dated Mar. 17, 2011, total 11 pages.
Non-Final Office Action in U.S. Appl. No. 12/352,516 dated Jan. 24, 2012, total 12 pages.
Non-Final Office Action in U.S. Appl. No. 11/140,615 dated Jun. 6, 2007, total 13 pages.
Non-Final Office Action in U.S. Appl. No. 11/140,615 dated Mar. 14, 2008, total 15 pages.

* cited by examiner

POLYCRYSTALLINE DIAMOND MATERIALS HAVING IMPROVED ABRASION RESISTANCE, THERMAL STABILITY AND IMPACT RESISTANCE

CROSS-REFERENCE TO RELATED APPLICATIONS

This patent application is a continuation of and claims priority pursuant to 35 U.S.C. §120 to U.S. application Ser. No. 12/352,516, filed Jan. 12, 2009, now U.S. Pat. No. 8,309,050 issued Nov. 13, 2012, which is a continuation of U.S. application Ser. No. 11/140,615, filed on May 26, 2005, now U.S. Pat. No. 7,493,973 issued Feb. 24, 2009, which is specifically incorporated herein in its entirety, by reference.

FIELD OF THE INVENTION

This invention relates to polycrystalline diamond constructions used for subterranean drilling applications and, more particularly, to polycrystalline diamond constructions having a high diamond content that are treated to provide improved properties of abrasion resistance and thermal stability, while maintaining a desired degree of impact resistance, when compared to conventional polycrystalline diamond constructions.

BACKGROUND OF THE INVENTION

Polycrystalline diamond (PCD) materials known in the art are formed from diamond grains or crystals and a catalyst material, and are synthesized by high pressure/high temperature (HP/HT) processes. Such PCD materials are known for having a high degree of wear resistance, making them a popular material choice for use in such industrial applications as cutting tools for machining, and wear and cutting elements in subterranean mining and drilling, where such high degree of wear resistance is desired. In such applications, conventional PCD materials can be provided in the form of a surface layer or a material body of, e.g., a cutting element used with cutting and drilling tools, to impart desired levels of wear resistance thereto.

Traditionally, PCD cutting elements used in such applications are formed by applying one or more layers of such PCD-based material to, or forming a body of such PCD-based material, for attachment with a suitable substrate material. Example PCD cutting elements known in the art can include a substrate, a PCD surface layer or body, and optionally one or more transition or intermediate layers to improve the bonding between and/or provide transition properties between the PCD surface layer or body and the underlying substrate support layer. Substrates used in such cutting element applications include carbides such as cemented tungsten carbide (WC—Co).

Such conventional PCD material comprises about 10 percent by volume of a catalyst material to facilitate intercrystalline bonding between the diamond grains, and to bond the PCD material to the underlying substrate and/or transition layer. Metals conventionally employed as the catalyst are often selected from the group of solvent metal catalysts including cobalt, iron, nickel, and mixtures thereof.

The amount of catalyst material used to form PCD materials represents a compromise between desired properties of toughness and hardness/wear resistance. While a higher metal catalyst content typically increases the toughness of a resulting PCD material, such higher metal catalyst content also decreases the hardness and corresponding wear resistance of the PCD material. Thus, these inversely affected desired properties ultimately limit the flexibility of being able to provide PCD materials having desired levels of both wear resistance and toughness to meet the service demands of particular applications, such as cutting and/or wear elements used in subterranean drilling devices. Additionally, when variables are selected to increase the wear resistance of the PCD material, typically brittleness also increases, thereby reducing the toughness and impact resistance of the PCD material.

A further desired property of PCD constructions used for certain applications is that they be thermally stable during wear or cutting operating conditions. A problem known to exist with conventional PCD materials is that they are vulnerable to thermal degradation when exposed to elevated temperature cutting and/or wear applications. This vulnerability results from the differential that exists between the thermal expansion characteristics of the solvent metal catalyst material disposed interstitially within the PCD material and the thermal expansion characteristics of the intercrystalline bonded diamond. Such differential thermal expansion is known to start at temperatures as low as 400° C., can induce thermal stresses that can be detrimental to the intercrystalline bonding of diamond and eventually result in the formation of cracks that can make the PCD structure vulnerable to failure. Accordingly, such behavior is not desirable.

Another form of thermal degradation known to exist with conventional PCD materials is one that is also related to the presence of the solvent metal catalyst in the interstitial regions of the PCD material and the adherence of the solvent metal catalyst to the diamond crystals. Specifically, the solvent metal catalyst is known to cause an undesired catalyzed phase transformation in diamond (converting it to carbon monoxide, carbon dioxide, or graphite) with increasing temperature, thereby limiting practical use of the PCD material to about 750° C.

It is, therefore, desirable that a PCD material be developed that displays improved properties of wear and abrasion resistance, and thermal stability for use in complex wear environments, when compared to conventional PCD materials, while not sacrificing toughness or impact resistance, making them well suited for use in the same applications.

SUMMARY OF THE INVENTION

PCD materials and PCD compacts formed therefrom, according to the principles of this invention, comprise a diamond body having a plurality of bonded diamond crystals and a plurality of interstitial regions disposed among the crystals. The diamond body is formed from subjecting diamond grains and a catalyst material to high pressure/high temperature conditions. The diamond grains used to form the PCD materials can have a monomodal or multimodal distribution of diamond grains, and the diamond grains are selected having a average particle size that is about 0.03 mm or greater.

A feature of such PCD materials is that at least a portion of the diamond body has a high diamond volume content or density of greater than about 93 percent by volume, and preferably within the range of from about 93 to 99 percent by volume. The diamond body can exist entirely of high volume content diamond, or can comprise a region that includes the high volume content diamond and other regions that do not. Additionally, the diamond content within the diamond body can be constant within a region or can vary within a region.

The diamond body includes a working surface positioned along an outside portion of the body, a first region that is substantially free of the catalyst material, and a second region that includes the catalyst material. At least a portion of the first region extends from the working surface to depth of from about 0.01 to about 0.1 mm. The PCD material can be provided in the form of a PCD compact, further comprising a substrate, such as a carbide substrate, integrally attached to the diamond body.

PCD materials, and PCD compacts formed therefrom, constructed in this manner exhibit improved properties of wear and abrasion resistance, and thermal stability for use in complex wear environments, when compared to conventional PCD materials.

BRIEF DESCRIPTION OF THE DRAWINGS

These and other features and advantages of the present invention will become appreciated as the same becomes better understood with reference to the specification, claims and drawings wherein:

DETAILED DESCRIPTION

As used in this specification, the term polycrystalline diamond, along with its abbreviation "PCD," is used herein to refer to the resulting material produced by subjecting individual diamond crystals or grains and a catalyst material to sufficiently high pressure and high temperature conditions that causes intercrystalline bonding to occur between adjacent diamond crystals to form a network of diamond crystal-to-diamond crystal bonding. PCD materials of this invention include at least a region having a diamond content or density of greater than about 93 percent by volume. Such diamond content can be achieved through the use of selectively sized diamond grains to achieve a high degree of diamond packing, and/or by using certain processing techniques to control metal or porosity content. PCD materials of this invention are also treated after being sintered to provide a desired degree of thermal stability along at least a region of the material, e.g., a region adjacent a working surface. Thus, through the selective use of diamond grain size, and/or processing techniques, and postsintering treatment, PCD materials of this invention are engineering to provide combined properties of thermal stability, impact resistance, fatigue resistance, functional toughness, and wear resistance that exceed those of conventional PCD materials.

Figure 1:
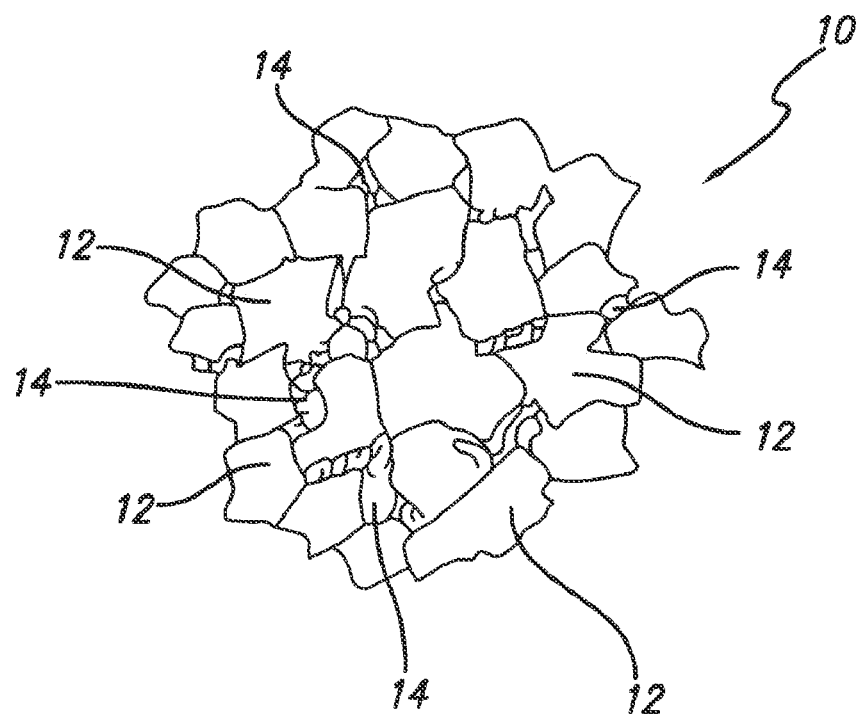
FIG. 1 is a cross-sectional view of a region of PCD material prepared according to this invention.

FIG. 1 illustrates a region of a PCD material 10 of this invention formed/sintered by HP/HT process. The PCD material has a material microstructure comprising a material phase of intercrystalline diamond made up of a plurality of bonded together adjacent diamond grains 12, and interstitial regions 14 disposed between the bonded together adjacent diamond grains. A catalyst material is disposed within the interstitial regions and is used to facilitate the diamond-diamond bonding that occurs during the HP/HT process.

The catalyst material used to facilitate diamond-to-diamond bonding can be provided generally in two ways. It can be provided in the form of a material powder that is mixed or otherwise present with the diamond grains prior to sintering, or it can be provided by infiltration into the diamond material during HP/HT processing from an adjacent material, such as a substrate material comprising the catalyst material that the PCD material is bonded to.

The diamond grains used to form PCD materials of this invention can be synthetic or natural. In certain applications, such as those calling for an improved degree of control over the amount of catalyst material remaining in the PCD material, it may be desired to use natural diamond grains for their absence of catalyst material entrapped within the diamond crystals themselves. The size of the diamond grains used to make PCD materials of this invention can and will vary depending on the particular end use application, and can consist of a monomodal distribution of diamond grains having the same general average particle size, or can consist of a multimodal distribution (bi, tri, quad, penta or log-normal distribution) of different volumes of diamond grains of different average particle size.

Generally speaking, PCD materials formed from fine-sized diamond grains, e.g., diamond grains having an average particle size of about 0.01 mm or less, while capable of providing a useful degree of mechanical wear resistance, my not provide levels of thermal stability and toughness necessary for certain demanding wear or cutting applications, such as for cutting and wear elements of a subterranean drill bit. Accordingly, it is desired that PCD materials of this invention be formed from either a monomodal distribution of diamond grains having an average particle size of about 0.03 mm or greater, or a multimodal distribution of diamond grains having an overall average particle size of about 0.03 mm or greater.

In forming PCD materials of this invention form either a monomodal or multimodal distribution of diamond grains, the use of diamond grains having an average particle size of about 0.03 mm or greater is desired for the purpose of providing a desired level of thermal stability and toughness when compared to conventional PCD materials formed primarily from smaller-sized diamond grains. The amount of catalyst material remaining in the interstitial regions of PCD increases with decreasing diamond grain size or increasing surface area. Thus, a feature of PCD materials of this invention formed from diamond grains having an average particle size of about 0.03 mm or more is that they have less catalyst material remaining in the interstitial regions than conventional PCD materials formed from smaller-sized diamond grains. This operates to help provide an improved level of thermal stability when compared to such conventional PCD materials. Diamond grains having an average particle size of greater than about 0.03 mm are referred to in this description as "coarse-sized" diamond grains for purposes of distinguishing such diamond grains from other smaller-sized diamond grains.

As briefly noted above, PCD materials of this invention can be formed using a monomodal or multimodal distribution of diamond grains having the above-described average diamond particle size. In one example embodiment, where a monomodal or single distribution of diamond grains is used, the average particle size of approximately all of the diamond grains is about 0.03 mm or more. In another example embodiment, where PCD materials of this invention are formed from a multimodal distribution of diamond grains, there can be two or more populations of diamond grains sized differently from one another that are combined or mixed together to form PCD materials of this invention. In such multimodal distribution, the overall average particle size of all diamond grains in the distribution will be about 0.03 mm or more.

When describing the average particle size of diamond grains used to form PCD materials of this invention, it is important to clarify that the particle sizes described herein refer to the starting raw material size of diamond grains before they are combined with other materials, and/or mixed, and/or otherwise processed, as these subsequent processing steps are known to further reduce the size of the diamond grains, e.g., by as much as 40 to 50 percent. Accordingly, it is to be understood that the particle sizes of diamond grains described herein refer to the particle size of the starting raw diamond grains.

A desired feature of PCD materials of this invention is that they include at least a region having a high diamond content of greater than about 93 percent by volume, or more preferably a diamond content in the range of from about 93 to 99 percent by volume. Depending on the particular end use application, PCD materials of this invention can consist entirely of the high diamond content, i.e., have no other regions comprising a different diamond content, or can be embodied having one or more regions comprising the high diamond content, i.e., having one or more other region having a different diamond content. The exact diamond density of PCD materials of this invention can be controlled by the choice of diamond grain size and/or diamond grain size distribution to achieve a high degree of diamond packing, and/or by the use of certain processing methods, e.g., certain mixing and/or reduction processes, that can also operate to increase the volume content of diamond grains and reduce the metal or porosity content. For example, Generally, PCD materials of this invention are initially constructed to include at least a region having a diamond density of greater than about 93 percent by volume for the purpose of controlling the amount of catalyst material disposed within the interstitial regions, again to provide an improved degree of thermal stability over conventional PCD that typically include on the order of about 10 percent catalyst material.

Since PCD materials of this invention are further treated to render a region thereof substantially free of the catalyst material, the reduction in catalyst material resulting from such high diamond content operates to cause a corresponding reduction in porosity in this substantially free catalyst material region. Such reduced porosity is desired in the PCD material because the compressive strength of PCD is known to increase with decreasing porosity, thereby operating to provide a desired high level of compressive strength. For example, PCD materials of this invention having a diamond content of approximately 98 percent by volume display a level of compressive strength that is at least twice that of conventional PCD materials having a diamond content of about 90 percent by volume.

PCD materials of this invention also include a remaining region that is not rendered substantially free of the catalyst material. It has been discovered that such catalyst containing region in the PCD materials of this invention display a desired level of fracture strength and toughness when the catalyst material content is greater than about 2 percent by volume, and preferably in the range of from about 3 to 4 percent by volume. Thus, PCD materials comprising such catalyst material content provide desired combined properties of hardness, fracture toughness and strength making them well suited for use as a cutting or wear element in subterranean drilling.

In an example embodiment, PCD materials of this invention having a high diamond content are formed from a multimodal distribution of differently sized diamond grains. In one such embodiment, the total diamond grains are sized having an average particle size of 0.03 mm or greater, and in a preferred embodiment a majority of the diamond grains have an average particle size of 0.04 mm or greater, and most preferably in the range of from about 0.05 mm to 0.1 mm. In an example embodiment, such majority amount is greater than 50 percent by volume of all diamond grains, and preferably is in the range of from about 55 to 90 percent by volume of the total diamond content.

In such example embodiment, a remaining minority volume content of the diamond grains has an average particle size of less than about 0.03 mm, and in a preferred embodiment has an average particle size of less than about 0.02 mm, and more preferably from about 0.02 mm to 0.2 µm. In an example embodiment, the minority amount is less than 50 percent by volume of all the diamond grains, and preferably is in the range of about 5 to 45 percent by volume of the total diamond content.

The exact number of different diamond grain distributions used to form PCD materials of this invention can and will vary depending on a number of different factors such as the ultimate desired diamond density, the desired properties of wear and abrasion resistance, the desired properties of fracture toughness and impact resistance and thermal stability called for by the particular end use application, as well as the type and size of catalyst material that is used, and the temperature and/or pressure conditions that are used to process the diamond grain mixture. In practice, PCD materials having a diamond content of greater than about 93 percent by volume can be achieved by the judicious selection of different diamond grain size and volume fraction of each diamond grain size.

Catalyst materials 14 useful for forming PCD materials of this invention can include solvent metal catalysts typically used for forming conventional PCD, such as the metals found in Group VIII of the Periodic table. Example solvent metal catalysts include Co, Ni, Fe and mixtures thereof. As discussed above, the properties of wear and abrasion resistance and toughness and impact resistance of the PCD material are inversely related to one another, and are dependent on the relative amounts of catalyst material and diamond grains that are used. The presence of diamond grains, and related diamond-to-diamond bonding, is necessary to provide desired properties of high strength and wear and abrasion resistance to the PCD material.

PCD materials of this invention can be formed by using in the range of from about 1 to 7 percent by volume catalyst material based on the combined volume of the catalyst material and the diamond grains. The exact amount of catalyst material used to form PCD materials of this invention will vary depending on the desired mechanical properties of the PCD material to meet the particular end use application. In end use applications calling for high levels of hardness, wear and abrasion resistance and relatively low levels of fracture toughness and strength, an amount of catalyst at the low end of the range may be appropriate. In end use applications calling for a higher level of fracture toughness and strength, an amount of catalyst at the higher end of the range may be appropriate. Where the PCD material is being used as a cutting or wear element for subterranean drilling, a preferred amount of catalyst used to form the PCD material is from about 3 to 4 percent by volume.

In example embodiments of this invention the catalyst material is provided by infiltration during the HPHT process from an adjacent substrate that contains the catalyst material. In fewer embodiments, the catalyst material can be provided in the form of a powder that is combined with the diamond grains. In such embodiment, where Co is selected as the catalyst material, it can be provided in the form of an ultra fine powder having an average grain size in the range of from about 1 to 5 micrometers. Using a catalyst material having a grain size within this range is desired because it minimizes the resultant size of residual voids, porosity, or cores in the microstructure, thereby helping to reduce the adverse impact on compressive strength due to the voids, porosity, or cores. As noted above, in a preferred embodiment, the catalyst material is provided into the diamond powder by infiltration from a catalyst-containing substrate, e.g., a carbide substrate, material during the HPHT sintering process.

PCD materials of this invention can be prepared from a volume of diamond grains, or by forming a mixture of diamond grains and catalyst power as noted above, and then placing the volume of diamond grains of the mixture into a suitable container or vessel that both shapes the volume or mixture and sinters it into a PCD body when placed into a HPHT device and subjected to the HPHT process conditions. For example, when used to form a working surface on a subterranean drill bit cutting or wear element, the volume or mixture is formed into a shape that will cover a surface portion of or form a PCD body of the cutting element. Alternatively, if desired, the volume or mixture can be configured in the shape of the entire cutting element.

Instead of being provided in the form of diamond powder or a mixture of diamond and catalyst material powders, PCD materials of this invention can be prepared from a diamond grains or a mixture of diamond grains and a catalyst material provided in a green-state/unsintered form, e.g., provided in the form of a conformable part or element such as a tape or the like made from diamond grains or a mixture of diamond grains and a catalyst powder with a binding agent. Further, the PCD materials of this invention can be provided in the form of an aggregation of a plurality of green-state parts or elements, e.g., such as granules, that each comprise a volume of the diamond grains or a mixture of the diamond grains and catalyst material with a binding agent. In each such alternative embodiment, the green-state part or parts are loaded into a container for subsequent shaping and sintering during the HPHT process. In the event that the PCD materials are provided in the form of a green-state part, a preheating step may be needed prior to sintering to dewax or drive off the binding agent prior to sintering.

The desired high diamond content in PCD materials of this invention can be achieved in the manner noted above by the judicious selection and combination of specifically sized diamond grains to obtain a high level of diamond packing to reduce porosity in the resulting PCD body. However, to obtain a good PCD density with low metal or porosity content, one or more other techniques can be used. One such technique involves subjecting the diamond grains to a reduction process that enables a certain amount of graphitization of the diamond grains. The degree of graphitization depends on such factors as the diamond grain or particle size, and the reduction temperature and the environment used during reduction.

In an example embodiment, such graphitization is conducted prior to the HPHT sintering process by reducing the diamond grain powder in a vacuum environment, e.g., a vacuum furnace, at a temperature of between about 1200° C. to 1500° C. The desired degree of graphitization can be obtained by controlling the temperature and time relating to the reduction process. Alternatively, the diamond grains can also be graphitized at lower temperature in the presence of air or moisture. Another technique useful for obtaining high diamond content in PCD with low metal or porosity content is by using diamond grains that are combined with a polymer or other material that is capable of leaving a carbon residue upon heating. In one example, diamond grains provided in the form of a green-state element such as a diamond tape, that includes a polymer binding agent to conform and bind the diamond grains, can be debound in a furnace to provide a residue of carbon that operates to effectively reduce metal and porosity content in the subsequently sintered PCD material.

Sintered PCD bodies formed from PCD materials of this invention can have a single diamond content, i.e., the high diamond content noted above, extending throughout the entire body volume, or can comprise at least one region containing the high diamond content and one or more other regions having a diamond content that is different from that of the high diamond content region, i.e., that is not formed entirely from the high diamond content material. For example, it may be desirable in certain end use applications to have a PCD body comprising a diamond volume content in a region positioned adjacent a working surface of the body that is different from that in another region of the body that is more distant from the working surface. Also, it may be desirable that the volume content of diamond in a region of the PCD body to be rendered substantially free of the catalyst material and thermally stable be different from that of a region of the PCD body retaining the catalyst material for the purpose of controlling the extent of pores created in the thermally stable region, thereby controlling the compressive strength of the PCD body in such thermally stable region.

Any differences in diamond volume content in the PCD body can be provided in the form of a step change or can be provided in the form of a gradient change depending on the desired end use mechanical properties of the body to accommodate the particular end use application. Thus, it is to be understood that PCD bodies can be constructed comprising a constant diamond volume content throughout, or can be constructed comprising one or more regions having a changing or different diamond volume content.

PCD bodies comprising regions having different diamond volume contents or densities can be formed by using powder or green state diamond grains or a mixture of diamond grains and catalyst materials in the manner described above, wherein the different volumes of diamond grains and catalyst materials giving rise to the different diamond volume contents are positioned within the container as needed to provide the desired differently positioned regions in the sintered PCD body.

In an example embodiment, where PCD materials are constructed for use as a wear or cutting element on a subterranean drill bit, the PCD material is sintered by HPHT process to form a PCD body that is integrally joined to a substrate, thereby forming a PCD compact. In such embodiment, a suitable substrate or substrate-forming material is positioned adjacent the diamond grain volume or mixture of diamond grains and catalyst material volume, and the combined assembly is placed into the HPHT device for sintering and bonding.

Suitable materials useful as substrates for forming PCD compacts include those conventionally used as substrates for conventional PCD compacts for the purpose of attaching the compact to a desired cutting or wear tool. Suitable substrate materials include those formed from metallic materials, ceramic materials, cermet materials, and mixtures thereof. In an example embodiment, the substrate is provided in a preformed state. Alternatively, the substrate can be provided in the form of a mixture of substrate precursor powders, or can be provided in the form of a green-state part. In an example embodiment, the substrate includes a catalyst material in the form of a metal solvent catalyst that is capable of infiltrating into the adjacent diamond powder during processing to facilitate diamond-to-diamond bonding to form the body, and to provide an integrally bonded attachment therewith to form the PCD compact. Suitable metal solvent catalyst materials include those discussed above in reference to the catalyst material. A particularly preferred metal solvent catalyst is Co. In a preferred embodiment, the substrate material comprises WC—Co.

If desired, the substrate and PCD material can be configured having planar interfacing surfaces, or can be configured having nonplanar interfacing surfaces. In certain applications calling for a high level of bond strength in the PCD compact between the PCD body and the substrate, the use of a nonplanar interface may be desired to provide an increased surface area between the adjoining surfaces to enhance the extent of mechanical coupling and load carrying capacity therebetween. The nonplanar interface can be provided in the form of a single or multiple complementary surface features disposed along each adjacent PCD body and substrate interface surface.

Figure 2:
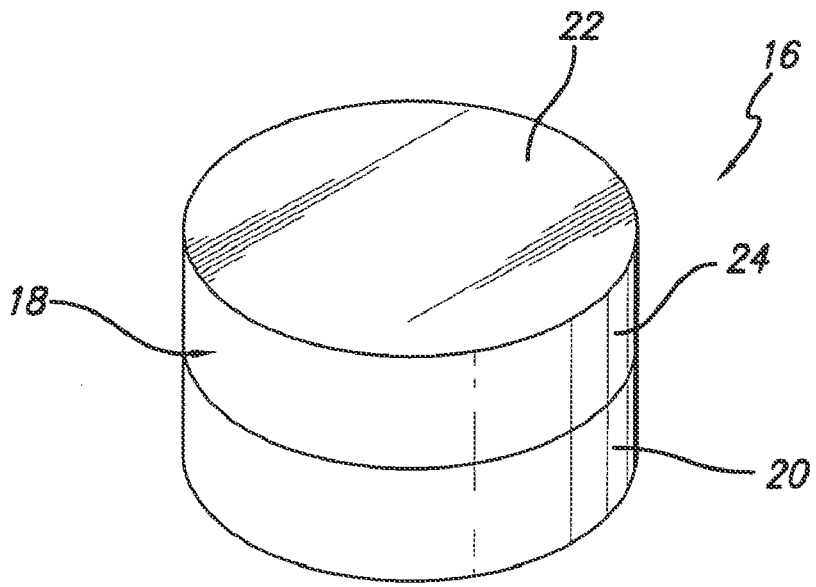
FIG. 2 is perspective side view of a PCD compact comprising the PCD material of FIG. 1 joined to a substrate.

FIG. 2 illustrates a PCD compact 16 comprising a PCD body 18, made from the PCD material described above and having a high diamond volume content or density, and that is integrally joined to a substrate 20. This example embodiment, the PCD compact 16 has a generally planar working surface 20 positioned along a top portion of the PCD body. Additionally, depending on the particular use application, all or part of the side surface 24 of the PCD body may also serve as a working surface. While a particular embodiment of the PCD compact has been illustrated, namely, one having a generally flat working surface and a cylindrical outside wall surface, it is to be understood that the particular configuration of PCD compacts can and will vary depending on the particular use application, and such variations in configuration are intended to be within the scope of this invention.

Once formed, the PCD compact is additionally treated for rendering a desired region relatively more thermally stable than a remaining region of the PCD body. In an example embodiment, the thermally stable region extends from a working surface 22 and/or 24 of the PCD body. This treatment can be performed, for example, by removing substantially all of the catalyst material from the selected region by suitable process, e.g., by acid leaching, aqua regia bath, electrolytic process, or combinations thereof. Alternatively, rather than actually removing the catalyst material from the targeted region of the PCD body or compact, the targeted region can be rendered thermally stable by treating the catalyst material in a manner that reduces or eliminates the potential for the catalyst material to adversely impact the intercrystalline bonded diamond within this region at elevated temperatures.

For example, the catalyst material can be combined chemically with another material to cause it to no longer act as a catalyst material, or can be transformed or reacted into another material that again causes it to no longer act as a catalyst material. Accordingly, as used herein, the terms "removing substantially all" or "substantially free" as used in reference to the catalyst material is intended to include the different methods in which the PCD body can be treated with respect to the catalyst material so as to no longer adversely impact the intercrystalline diamond in the PCD body or compact with increasing temperature.

It is desired that the selected thermally stable region of the PCD body extends a determined depth from a surface of the body, e.g., a working, wear or cutting surface, independent of the working or cutting surface orientation. Again, it is to be understood that the working or cutting surface may include more than one surface portion of the PCD body. The exact depth of the thermally stable region within the PCD body can and will vary depending on a number of factors such as the particular end use application, and the diamond volume content or density in the region of the PCD body to be treated.

Figure 3:
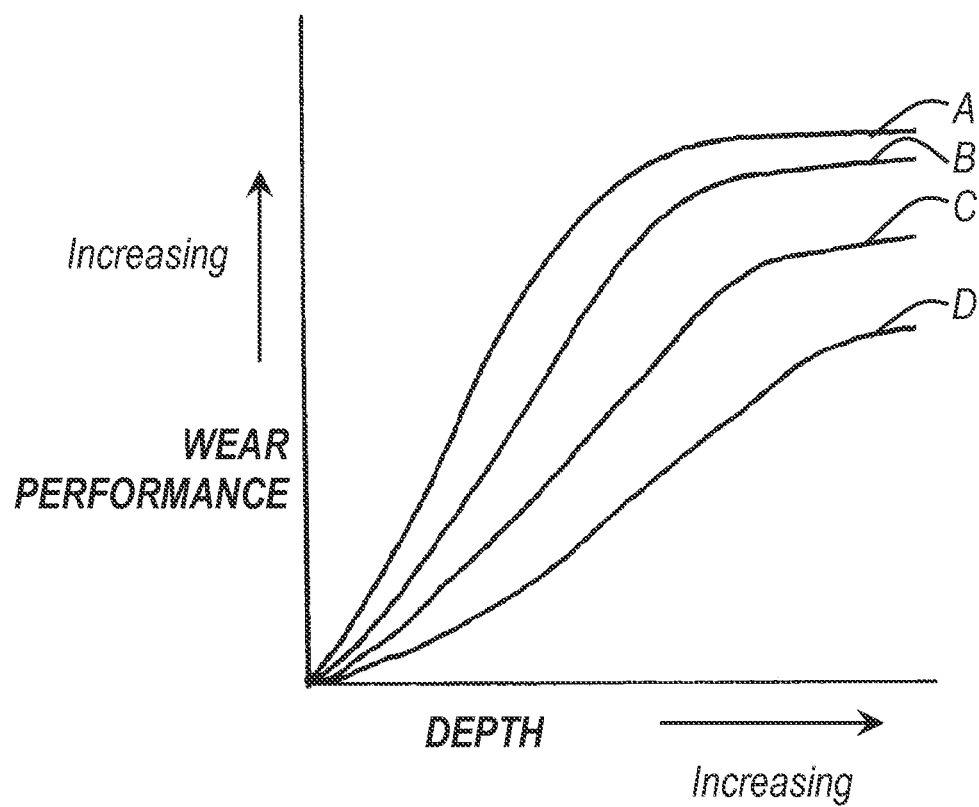
FIG. 3 is a graph presenting performance curves for different PCD materials having different diamond densities.

FIG. 3 graphically illustrates the relationship that exists between PCD body diamond volume content or diamond density and the leaching depth needed to obtain a desired level of PCD body performance. Generally speaking, the diamond volume content of the region in the PCD body to be treated will impact the depth of treatment needed to obtain a desired degree of thermal stability in such region in the following manner. Generally speaking, the greater the diamond content in such region the lower the treatment depth needed to obtain a desired level of thermal stability. Referring to FIG. 3, curve A represents the performance curve for a PCD body having a diamond density in the targeted region of say about 95 percent by volume, while remaining curves B, C and D represent performance curves for PCD body regions having a decreasing diamond density of say 90, 85 and 65 percent by volume respectively.

As shown in this illustration, PCD bodies formed having a higher diamond volume content or density, e.g., greater than about 93 percent by volume, will provide a higher level of performance for a given treatment depth when compared to PCD bodies having a lower diamond volume content at the same or even possibly a greater treatment depth. Accordingly, the diamond content of the target region to be rendered thermally stable will have a significant impact on the depth of treatment needed to render the region thermally stable to provide a desired level of performance such as wear resistance.

In an example embodiment, for PCD bodies comprising a diamond content of greater than about 93 percent by volume, a desired degree of thermal stability providing performance properties suitable for use in subterranean drilling applications is achieved from a thermally stable region that extends from a working, wear or cutting surface of the PCD body an average depth of less than about 0.01 mm, and preferably less than about 0.08 mm, and more preferably less than about 0.05 mm. For PCD bodies having a diamond content of say about 95 percent by volume or greater, such desired performance properties can be obtained from a thermally stable region having an average depth from the working surface of 0.03 mm or less. Again, as noted above, the diamond content of the region to be rendered thermally stable will have a significant impact on the depth needed to achieve the degree of thermal stability to provide the desired performance properties. In an example embodiment, the thermally stable region extends from at least a portion of the working, wear or cutting surface an average depth of from about 0.01 mm to about 0.08 mm, and more preferably from about 0.04 mm to about 0.07 mm.

Generally, it has been shown that a thermally stable region within these depths, when combined with the feature forming the PCD body from a high-density PCD material as described above, produces a PCD compact having improved properties of thermal stability and wear and abrasion resistance when compared to conventional PCD compacts, while also providing and not sacrificing properties of fracture strength, impact resistance and toughness.

It is to be understood that the depth of the thermally stable region from the working or cutting surface is represented as being a nominal, average value arrived at by taking a number of measurements at preselected intervals along this region and then determining the average value for all of the points. The region remaining within the PCD body or compact beyond this thermally stable region is understood to still contain the catalyst material.

Additionally, when the PCD body to be treated includes a substrate, i.e., is provided in the form of a PCD compact, it is desired that the selected depth of the region to be rendered thermally stable be one that allows a sufficient depth of catalyst-containing region remaining in the PCD compact to not adversely impact the attachment or bond formed between the PCD body and the substrate, e.g., by solvent metal infiltration, during the HP/HT process. In an example PCD compact embodiment, it is desired that the untreated or remaining region within the PCD body have a thickness that is sufficient to maintain a desired bond strength between the PCD body and substrate. In an example embodiment, the untreated region within the PCD body may extend a distance of at least about 0.01 mm as measured from the substrate. It is, however, understood that the exact thickness of the PCD region containing the catalyst material adjacent the substrate can and will vary depending on the diamond particle size and diamond density of the PCD body and the intended use application.

In an example embodiment, the selected region of the PCD body is rendered thermally stable by removing substantially all of the catalyst material therefrom by exposing the desired working surface or surfaces to an acid leaching agent, as disclosed for example in U.S. Pat. No. 4,224,380, which is incorporated herein by reference. Generally, after the PCD body or compact is made by HP/HT process, the identified surface or surfaces, e.g., the working, wear or cutting surfaces, are placed into contact with the acid leaching agent for a sufficient period of time to produce the desired leaching or catalyst material depletion depth.

Suitable leaching agents for treating the selected region to be rendered thermally stable include materials selected from the group consisting of inorganic acids, organic acids, mixtures and derivatives thereof. The particular leaching agent that is selected can depend on such factors as the type of catalyst material used, and the type of other non-diamond metallic materials that may be present in the PCD material. It is desired that the leaching agent selected to treat the selected PCD body region be one capable of removing both the catalyst material and such other known metallic materials. In an example embodiment, suitable leaching agents include hydrofluoric acid (HF), hydrochloric acid (HCl), nitric acid ($HNO_3$), and mixtures thereof.

In an example embodiment, where the diamond body to be treated is in the form of a PCD compact, the compact is prepared for treatment by protecting the substrate surface and other portions of the PCD body adjacent the targeted treated region from contact (liquid or vapor) with the leaching agent. Methods of protecting the substrate surface include covering, coating or encapsulating the substrate and portion of PCD body with a suitable barrier member or material such as wax, plastic or the like.

Figure 4:
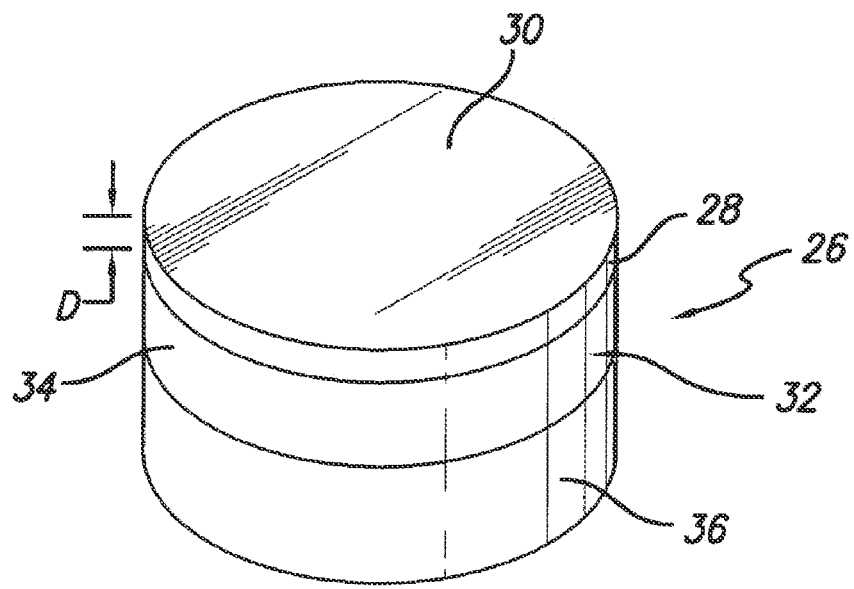
FIG. 4 is a perspective side view of the PCD compact of FIG. 2 after it has been treated to render a region extending a depth from a working surface thermally stable.
Figure 5:
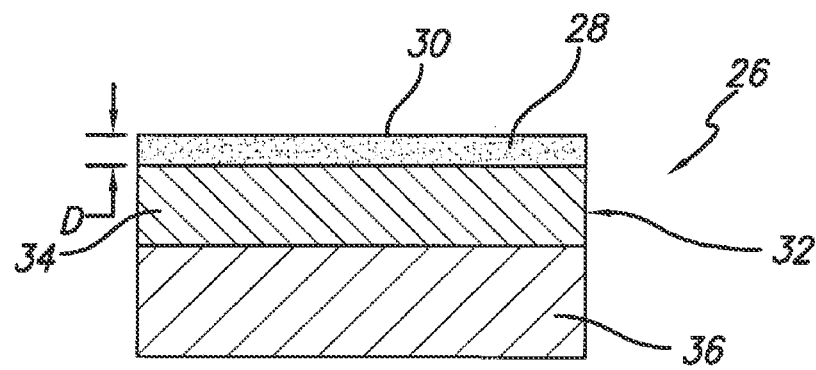
FIG. 5 is a cross-sectional side view of the PCD compact of FIG. 4.

FIGS. 4 and 5 illustrate an embodiment of a PCD compact 26 after its has been treated to render a selected region of the PCD body thermally stable. In this embodiment, the compact 26 comprises a thermally stable region 28 that extends a selected depth "D" from a working or cutting surface 30 of the PCD body 32. The remaining region 34 of the PCD body 32, extending from the thermally stable region 28 to the substrate 36, includes the catalyst material.

Figure 6:
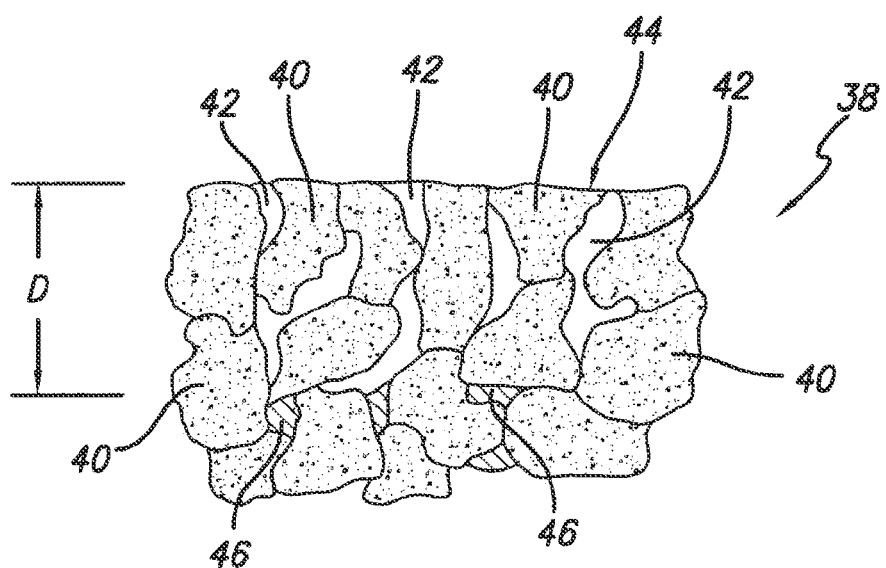
FIG. 6 is a schematic view of a portion of the PCD material microstructure of the PCD compact of FIG. 5 taken adjacent the working surface.

FIG. 6 illustrates in cross section the material microstructure 38 of the PCD body of this invention and, more specifically, a section of the microstructure that includes the thermally stable region of the PCD body. The thermally stable region comprises intercrystalline bonded diamond made up of the plurality of bonded together diamond grains 40, and a matrix of interstitial regions 42 between the diamond grains that are now substantially free of the catalyst material. The thermally stable region comprising the interstitial regions free of the catalyst material is shown to extend a distance or depth "D" from a working or cutting surface 44 of the PCD body. In an example embodiment, the depth "D" is identified and measured by cross sectioning a part, e.g., a PCD compact, comprising the PCD body and using a sufficient level of magnification to identify the interface between the first and second regions and taking an average of the measurements.

The so-formed thermally stable region of the PCD body of this invention is not subject to the thermal degradation encountered conventional PCD, resulting in improved thermal characteristics. The remaining region of the PCD body extending from depth "D" has a material microstructure that comprises PCD, as described above and illustrated in FIG. 1, that includes catalyst material 46 disposed within the interstitial regions.

As noted above, the location, size and orientation of the working, wear or cutting surface on the PCD body formed from PCD materials of this invention can and will vary depending on the particular working, wear or cutting application. In an example embodiment, where the PCD body is provided as part of a PCD compact configured as a cutting element for use in a subterranean drill bit, the working, wear or cutting surface can extend beyond the upper surface of the PCD body illustrated in FIG. 4.

Figure 7:
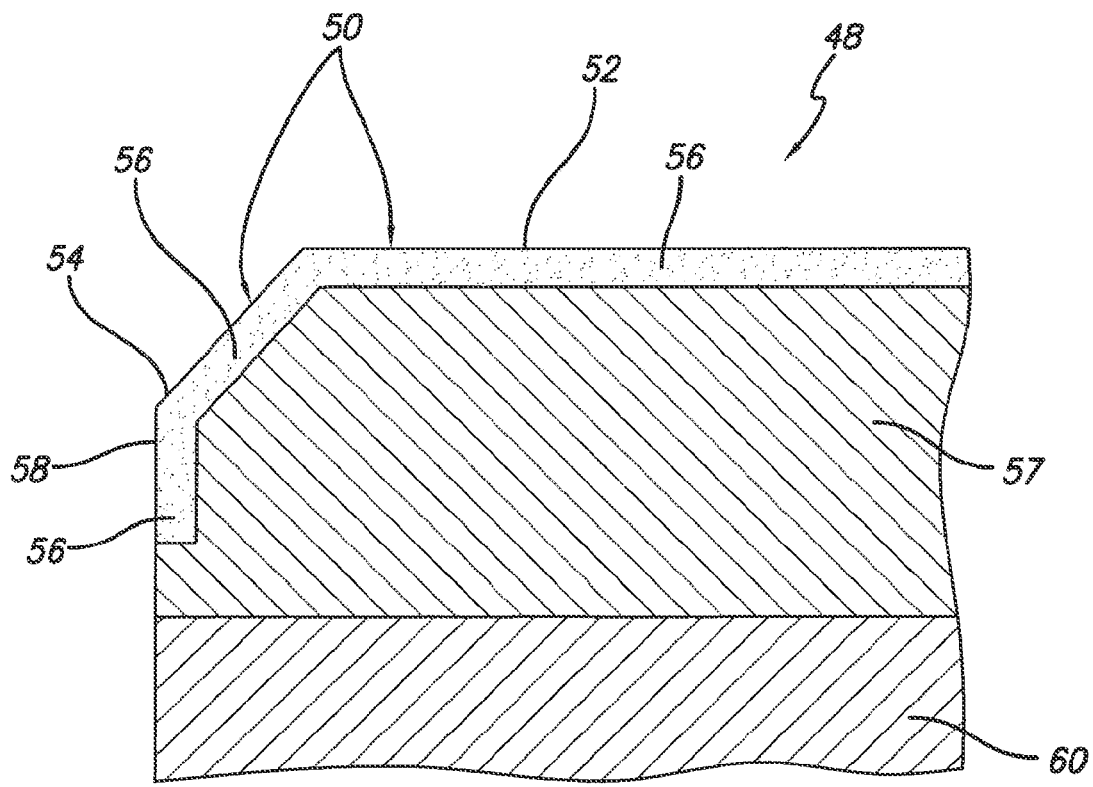
FIG. 7 is a cross-sectional side view of a PCD compact comprising a thermally stable region extending along a top, beveled, and side surface.

For example, FIG. 7 illustrates an example embodiment PCD compact 48 of this invention comprising a working surface 50 that extends from an upper surface 52 of the PCD body 57 to a beveled surface 54 of the PCD body that defines a circumferential edge of the upper surface. In this embodiment, the thermally stable region 56 extends the selected depth into the PCD body 57 from each of the upper and beveled surfaces 52 and 54 to provide a desired degree of thermal stability to each of these regions.

In such embodiment, prior to treating the PCD compact to render the selected region thermally stable, the PCD compact is formed to have such working surfaces, i.e., is formed by machine process or the like to provide the desired the beveled surface 54. Thus, a feature of cutting elements formed from PCD materials of this invention is that they include working, wear or cutting surfaces, independent of location or orientation, having a thermally stable region extending a predetermined depth into the diamond body.

For certain applications, it has been discovered that further improvements in thermal stability can be realized by extending the thermally stable region beyond the working surface of the construction, i.e., by rendering a surface portion other than but adjacent to the working or cutting surface thermally stable. This can include extending the thermally stable region along a side surface of the cutting element at least a partial length, and in some cases the entire length, to the substrate.

As illustrated for example in FIG. 7, the thermally stable region 56 has been extended along an outer surface portion 58 of the compact that extends axially away from the beveled surface 54 along a side surface of the PCD body towards the substrate 60. While this surface portion 58 may not actually be placed into working, wear or cutting contact, the presence of the thermally stable region positioned a distance along and adjacent to the beveled surface 54 has been observed to provide an enhanced degree of thermal stability to the construction. Accordingly, it is to be understood that the thermally stable region of the PCD material of this invention can formed at surfaces along the PCD body other than the working, wear or cutting surfaces to obtain a desired gain in thermal stability as called for by the particular end use application.

In an example embodiment, where the PCD material is provided in the form of a cutting element for use in a subterranean drill bit, and the cutting element may include a beveled transition between an upper working surface and a side outer surface, the thermally stable region may be extended axially from the beveled surface along the side surface for a distance that will vary depending on the particular construction size and application, but that will be sufficient to provide a desired degree of thermal conductivity enhancement to improve overall thermal stability of the construction.

As mentioned briefly above, PCD bodies of this invention may be constructed having a single homogeneous PCD phase or region comprising a single or constant diamond content, or may constructed comprising two or more PCD phases or regions that each have a different diamond content, wherein at least one of the regions include a diamond content that is greater than about 93 percent by volume. In the example where the PCD body consists of a generally homogenous PCD material having a single diamond content, the diamond content in such example embodiment will be greater than about 93 percent by volume. In the example where the PCD body comprises two or more regions of PCD material, at least one of the regions will have a diamond content of greater than about 93 percent by volume, and the remaining region or regions of PCD material can have a diamond content of greater than about 93 percent by volume or can have a diamond content that is less than about 93 percent by volume.

For PCD body embodiments comprising different regions having different diamond volume contents, the volume fraction of the high diamond content region can and will vary depending on the particular PCD body configuration and end use application. For use in certain end use applications, it may be desired that the volume fraction of the high diamond content region in the PCD body be greater than that of the remaining PCD body region or regions, while other end use applications may call for a PCD body having a lower volume fraction of the high diamond content region than that of the remaining PCD body region or regions. In an example embodiment, it is desired that the PCD body comprise that volume fraction of the high diamond content region necessary for promoting creation of the thermally stable region within a minimum depth from the working surface that will provide the desired performance properties of the PCD body and compact, thereby minimizing the material costs involved in manufacturing the same.

Figure 8:
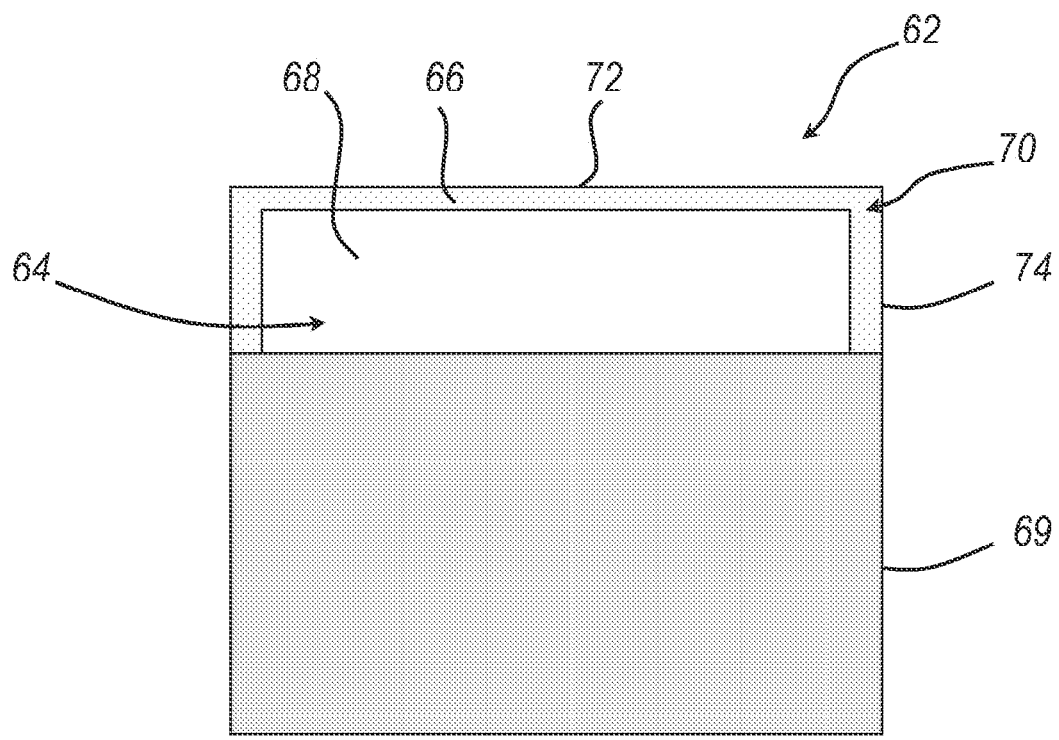
FIG. 8 is a cross-sectional side view of a PCD compact comprising a thermally stable region and comprising diamond regions having different diamond contents.

FIG. 8 illustrates an example embodiment of a PCD compact 62 of this invention that comprises a PCD body 64, comprising two different regions 66 and 68 that each have a different diamond volume content, and that is integrally joined to a substrate 69. As noted above, the diamond content in each of these regions may be greater than about 93 percent by volume, or the diamond content in one of these regions may be greater than about 93 percent by volume and the diamond content in the other of these regions may be less than about 93 percent by volume. Additionally, the PCD compact 62 of this example embodiment includes a thermally stable region 70 that extends a depth into the PCD body from working surfaces 72 and 74, which depth is within the parameters described above.

The particular placement location of the different diamond density regions within the PCD body is understood to vary depending on the particular end use application. For example, when used as a cutting element for subterranean drilling in environments calling for a high degree of hardness and wear resistance at the working surface without the need for a high level of fracture toughness or strength, the region 66 positioned along the working surfaces 72 and 74 can be formed from a PCD material having a higher diamond content than that of the remaining region 68. In another example, where properties of hardness, wear resistance and additionally fracture toughness and strength is desired at the working surface of the PCD compact, the region 66 can be formed from a PCD material having a diamond content that is less than that of the region 68. Accordingly, it is to be understood that the placement position of the different diamond content PCD regions can and will vary within the PCD body in such embodiments according to the particular mechanical and performance properties called for by the end use applications.

Also as noted briefly above, PCD bodies of this invention may include a PCD material or a region of PCD material that has a diamond content that changes as a function of position within the body. This change in diamond content can either be in the form of a step change or as a gradient within the PCD material or region of PCD material. For example, a PCD body of this invention may comprise a PCD material having a diamond content that gradually or suddenly changes, e.g., decreases or increases, moving away from the PCD body working surface. In one example embodiment, a PCD body of this invention comprises a PCD material having a decreasing diamond content moving away from the working surface, and that includes a thermally stable region that extends a depth from the working surface within the PCD body. The change in diamond content can be provided in step or gradient form within the PCD body. In any event, at least one region within the PCD body has a diamond content that is greater than about 93 percent by volume, wherein the placement position of this region will vary depending on the end use application.

PCD materials, PCD bodies, and compacts formed therefrom will become better understood and appreciated with reference to the following examples:

EXAMPLE 1

PCD Compact Formed From a Bimodal Diamond Grain Distribution

A PCD compact is formed from the PCD material of this invention in the following manner. Coarse-sized diamond grains having a bimodal distribution comprising a first population of diamond grains having an average grain size of about 40 µm, and a second population of diamond grains having an average grain size of about 75 µm are mixed together with Co powder having an approximate grain size of about 2 µm. The distribution of diamond grains and Co powder is as follows: approximately 80 percent by volume 40 µm diamond grains, and approximately 20 percent by volume 75 µm diamond grains. The mixture comprises approximately 95 percent by volume diamond grains and the remaining amount Co. The mixture is prepared for forming a PCD compact useful as a cutting element on a subterranean drill bit.

The mixture is loaded into a suitable container or capsule and is positioned adjacent a desired substrate useful for forming a point of attachment between the PCD compact and the drill bit. The container is loaded into a suitable HP/HT device, used for producing conventional PCD constructions, and the device is operated at a temperature and pressure sufficient to cause the mixture to be consolidated, sintered and integrally bonded with the substrate.

The container is removed from the device and the PCD compact is removed from the container. The so-formed PCD compact has a diamond content of approximately 94 percent by volume, and the remainder Co and Ni. The PCD compact is finished machined to an approximate dimension and configuration and a designated working surface is exposed to an acid leaching agent for a sufficient amount of time to form a thermally stable region in the PCD body that extends desired depth of approximately 0.08 mm from the designated working surface.

EXAMPLE 2

PCD Compact Formed from a Trimodal Diamond Grain Distribution

A PCD compact is formed from the PCD material of this invention in the following manner. A distribution of diamond particles having an average particle size of 0.06 mm, 0.03 mm, and 0.01 mm are mixed together in the ratio of 5:3:1. The mixed together diamond powder is heated to a temperature of approximately 1,450° C. in a vacuum for 1 hour to achieve a desired degree of graphitization. The graphitized diamond grain mixture is combined with a volume of Co and Ni powder, the total amount of these powders not exceeding 7 percent by volume. The resulting mixture is loaded into a suitable container or capsule and is positioned adjacent a WC—Co substrate. The container is loaded into a suitable HP/HT device, used for producing conventional PCD constructions, and the device is operated at a temperature and pressure sufficient to cause the mixture to be consolidated, sintered and integrally bonded with the substrate.

The container is removed from the device and the PCD compact is removed from the container. The so-formed PCD compact has a diamond content of approximately 96 percent by volume, and the remainder Co and Ni. The PCD compact is finished machined to approximate dimension and configuration and a designated working surface is exposed to an acid leaching agent for a sufficient amount of time to form a thermally stable region in the PCD body that extends a desired depth of approximately 0.03 mm from the designated working surface.

EXAMPLE 3

PCD Compact Formed from a Quadmodal Diamond Grain Distribution

A PCD compact is formed from the PCD material of this invention in the following manner. A distribution of diamond particles having an average particle size of 0.1 mm, 0.05 mm, 0.02 mm and 5 µm to 0.2 µm are mixed together in the ratio of 5:3:1:1. The mixed together diamond powder is heated to a temperature of approximately 1,400° C. in a vacuum for 30 minutes to achieve a desired degree of graphitization. The graphitized diamond grain mixture is combined with a volume of Co powder not exceeding 7 percent by volume, and the resulting mixture is loaded into a suitable container or capsule and is positioned adjacent a WC—Co substrate. The container is loaded into a suitable HP/HT device, used for producing conventional PCD constructions, and the device is operated at a temperature and pressure sufficient to cause the mixture to be consolidated, sintered and integrally bonded with the substrate.

The container is removed from the device and the PCD compact is removed from the container. The so-formed PCD compact has a diamond content of approximately 96 percent by volume, and the remainder Co. The PCD compact is finished machined to approximate dimension and configuration and a designated working surface is exposed to an acid leaching agent for a sufficient amount of time to form a thermally stable region in the PCD body that extends a desired depth of approximately 0.03 mm from the designated working surface.

A feature of PCD materials comprising a high diamond density is that such high diamond density operates to permit formation of a thermally stable region, suitable for use in extreme wear or cutting applications, within a depth from a working surface that is less than about 0.1 mm. Additionally, PCD materials comprising such high diamond density provide a desired degree of thermal stability within a relatively shallow region while also minimizing porosity in the microstructure, thereby providing improved compressive strength when compared to conventional PCD.

PCD materials can be used for a number of different applications, such as for forming cutting and/or wear elements of tools used for mining, cutting, machining and construction applications, where the combined properties of thermal stability, wear and abrasion resistance, and strength, toughness and impact resistance are highly desired. PCD materials are particularly well suited for forming working, wear and/or cutting surfaces on components used in machine tools and subterranean drill and mining bits such as roller cone rock bits, percussion or hammer bits, diamond bits, and shear cutters.

Figure 9:
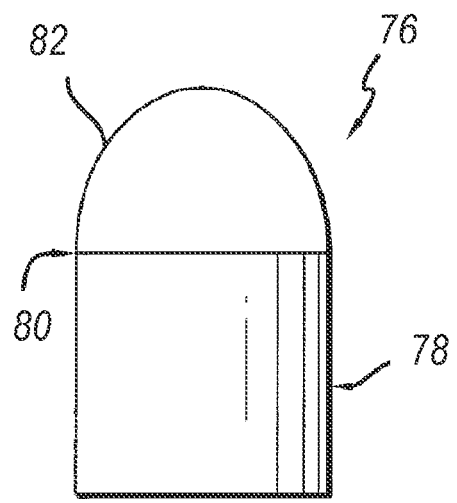
FIG. 9 is a perspective side view of the PCD compact embodied in the form of a cutting insert.

FIG. 9 illustrates an embodiment of a PCD body provided in the form of an insert 76 used in a wear or cutting application in a roller cone drill bit or percussion or hammer drill bit. For example, such PCD inserts 76 are constructed having a substrate 78, formed from one or more of the substrate materials disclosed above, that is attached to a PCD body 80 formed from the PCD material having the thermally stable region. In this particular embodiment, the insert 76 comprises a domed working surface 82, and the thermally stable region is positioned along the working surface and extends a selected depth therefrom into the PCD body 80. The insert 76 can be pressed or machined into the desired shape or configuration prior to the treatment for rendering the selected region thermally stable. It is to be understood that PCD materials can also be used to form inserts having geometries other than that specifically described above and illustrated in FIG. 9.

Figure 10:
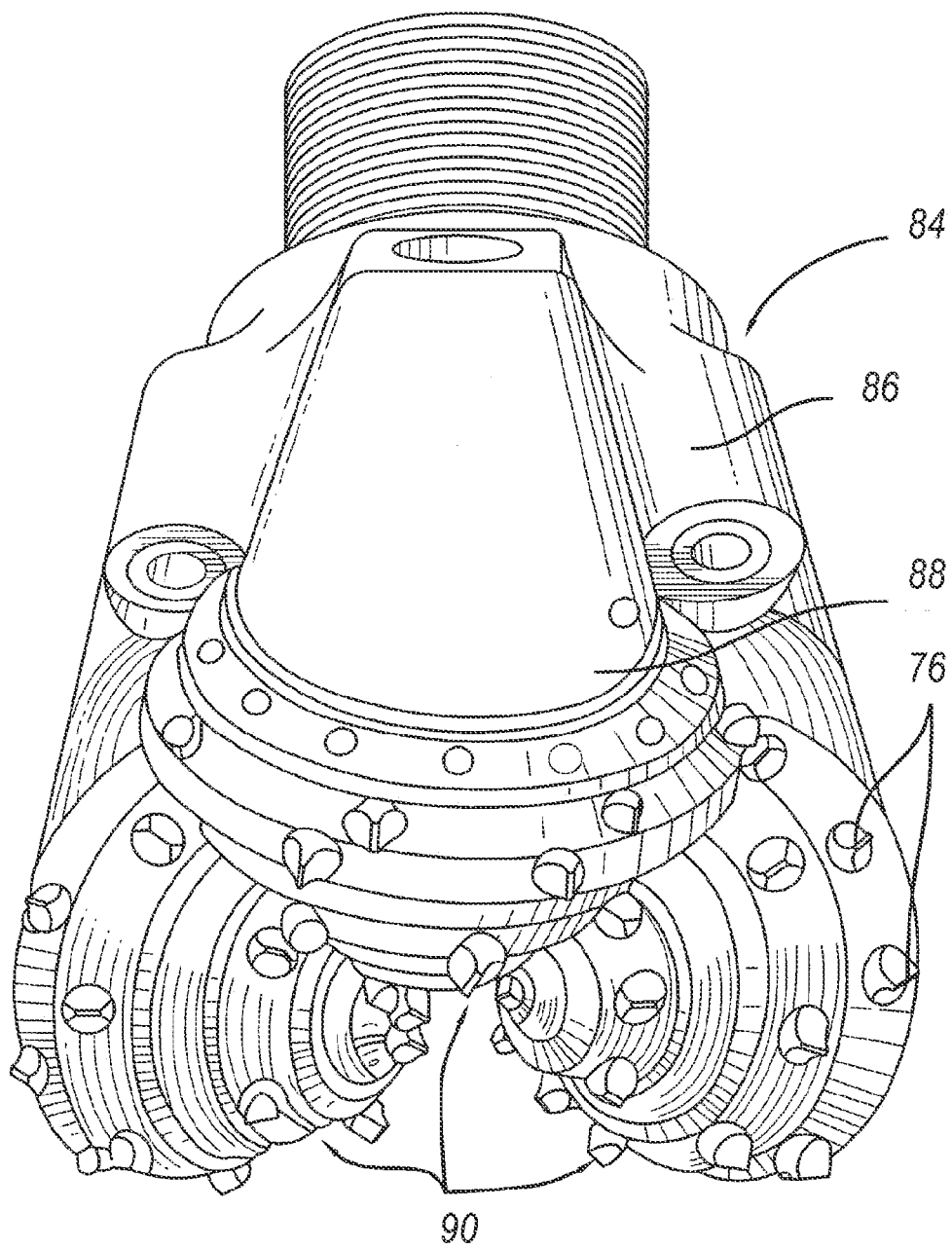
FIG. 10 is a perspective side view of a roller cone drill bit comprising a number of the cutting inserts of FIG. 9.

FIG. 10 illustrates a rotary or roller cone drill bit in the form of a rock bit 84 comprising a number of the wear or cutting PCD inserts 76 disclosed above and illustrated in FIG. 9. The rock bit 84 comprises a body 86 having three legs 88 extending therefrom, and a roller cutter cone 90 mounted on a lower end of each leg. The inserts 76 are the same as those described above comprising the PCD body and materials of this invention, and are provided in the surfaces of each cutter cone 90 for bearing on a rock formation being drilled.

Figure 11:
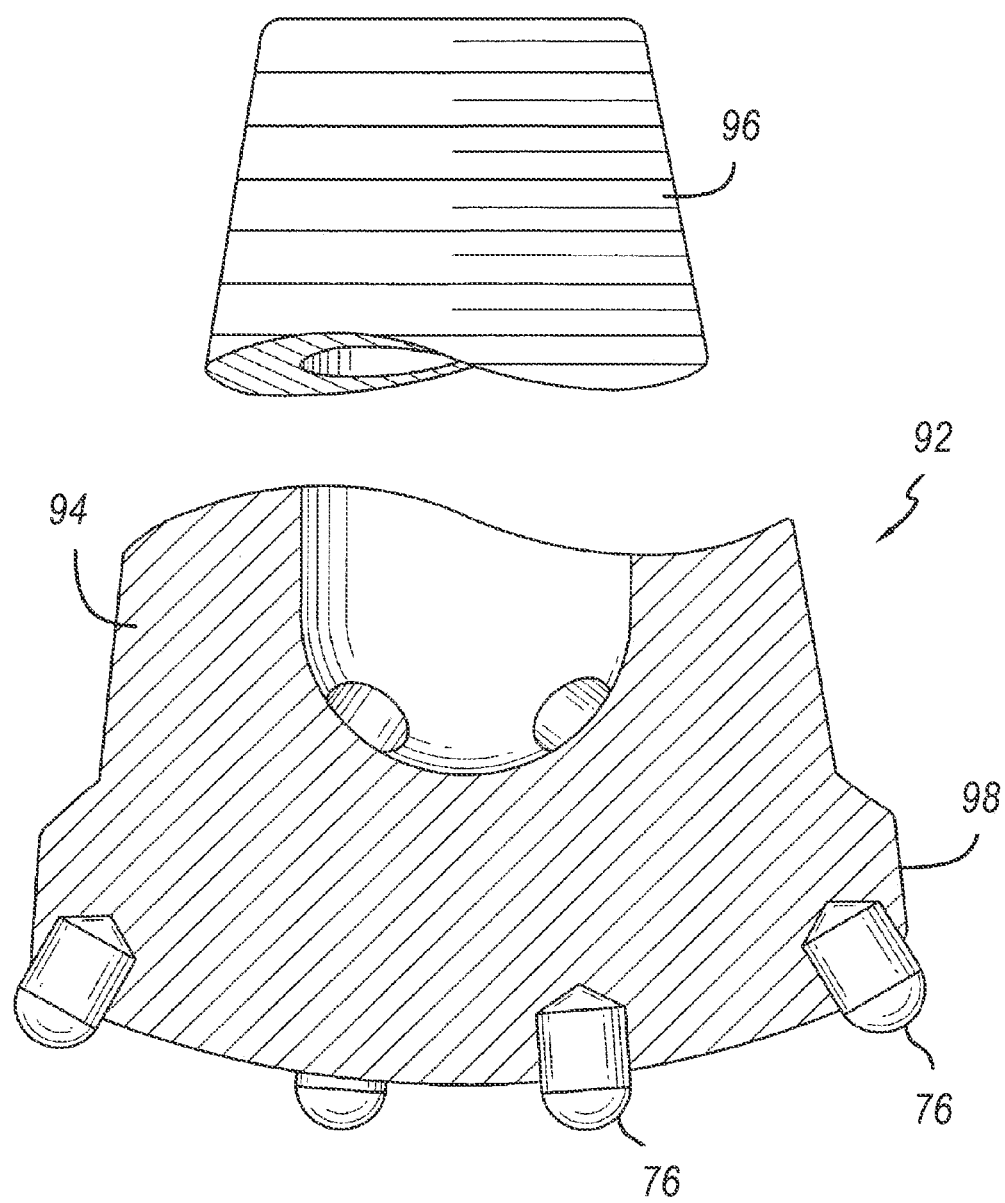
FIG. 11 is a perspective side view of a percussion or hammer bit comprising a number of the cutting inserts of FIG. 9.

FIG. 11 illustrates the PCD insert described above and illustrated in FIG. 9 as used with a percussion or hammer bit 92. The hammer bit generally comprises a hollow steel body 94 having a threaded pin 96 on an end of the body for assembling the bit onto a drill string (not shown) for drilling oil wells and the like. A plurality of the inserts 76 are provided in the surface of a body 98 of the body 94 for bearing on the subterranean formation being drilled.

Figure 12:
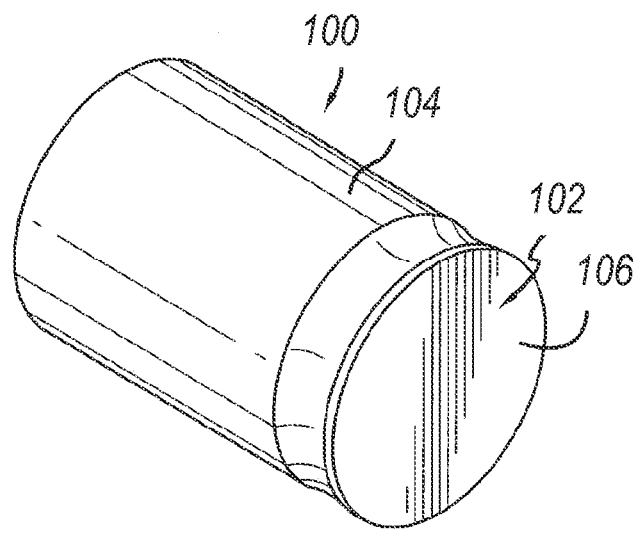
FIG. 12 is a perspective view of the PCD compact embodied in the form of a shear cutter.

FIG. 12 illustrates a PCD body of this invention as used to form a shear cutter 100 used, for example, with a drag bit for drilling subterranean formations. The PCD shear cutter 100 comprises a PCD body 102 that is sintered or otherwise attached to a cutter substrate 104 as described above. The PCD body 102 includes a working or cutting surface 106 that is formed from the PCD material comprising the thermally stable region of the PCD body. As discussed and illustrated above, the working or cutting surface for the shear cutter can extend from the upper surface to a beveled surface defining a circumferential edge of the upper, and the thermally stable region of the PCD body extends a desired depth from one or more of such working surfaces. Additionally, if desired, the thermally stable region of the PCD body can extend from the beveled or other working surface a distance axially along a portion of or the entire side surface of the shear cutter extending to the substrate 104 to provide an enhanced degree of thermal stability and thermal resistance to the cutter. It is to be understood that PCD materials can be used to form shear cutters having geometries other than that specifically described above and illustrated in FIG. 12.

Figure 13:
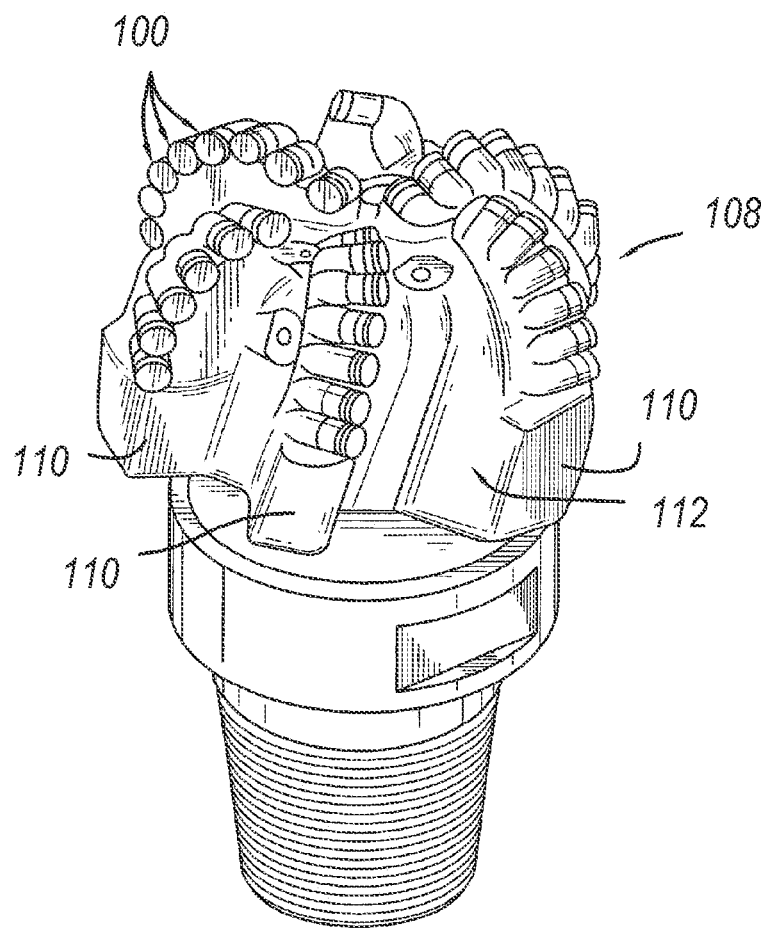
FIG. 13 is a perspective side view of a drag bit comprising a number of the shear cutters of FIG. 12.

FIG. 13 illustrates a drag bit 108 comprising a plurality of the PCD shear cutters 100 described above and illustrated in FIG. 12. The shear cutters are each attached to blades 110 that extend from a head 112 of the drag bit for cutting against the subterranean formation being drilled. Because the PCD shear cutters of this invention include a metallic substrate, they are attached to the blades by conventional method, such as by brazing or welding.

Other modifications and variations of PCD materials and constructions formed therefrom, and methods for making the same, according to the principles of this invention will be apparent to those skilled in the art. It is, therefore, to be understood that within the scope of the appended claims this invention may be practiced otherwise than as specifically described.

What is claimed is:

1. A method for making a diamond construction comprising the steps of:
   heating a volume of diamond grains to form graphite, wherein the diamond grains have a multimodal grain size distribution with an average particle size of greater than about 0.03 mm, and wherein the heating takes place in a vacuum environment;
   subjecting the volume of diamond grains to a high pressure/high temperature condition while the volume of diamond grains are positioned adjacent a metallic substrate comprising a catalyst material, wherein during the high pressure/high temperature condition the catalyst material infiltrates from the substrate into the volume of diamond grains to form a fully-sintered polycrystalline diamond body that is integrally joined to the metallic substrate; and
   treating at least a first region of the diamond body extending only a partial depth from a working surface to render the first region substantially free of the catalyst material while allowing the catalyst material to remain in an untreated second region of the diamond body, wherein the first region extends only a partial depth of from about 0.01 mm to 0.1 mm;
   wherein the metallic substrate is used to attach the diamond construction to subterranean drilling tool.

2. The method as recited in claim 1 wherein the step of heating takes place at a temperature in the range of from about 1,200 to 1,500° C.

3. The method as recited in claim 1 wherein the diamond body has a diamond content that is at least about 93 percent by volume.

4. The method as recited in claim 1 wherein the first region extends a depth of from about 0.02 to 0.05 mm.

5. The method as recited in claim 1 wherein the majority volume content of the diamond grains have an average particle size of about 0.05 to 0.1 mm.

6. A bit for drilling subterranean formations comprising a body and the diamond construction made according to the method as recited in claim 1, wherein the diamond construction is attached to the body by the metallic substrate.

7. The method as recited in claim 1 wherein the step of heating to form graphite is done in the absence of the catalyst material.

8. A method for making a polycrystalline diamond cutting element comprising the steps of:
   subjecting a volume of diamond grains to a high-temperature condition in a vacuum environment sufficient to form graphite on the diamond grains, wherein the graphite is formed in the absence of a catalyst material;
   sintering the volume of diamond grains under high pressure/high temperature conditions in the presence of a substrate comprising a catalyst material, wherein during the high pressure/high temperature condition the catalyst material infiltrates from the substrate and into the volume of diamond grains to form a polycrystalline diamond body and to integrally join the polycrystalline diamond body to the substrate;
   treating a first region of the diamond body extending only a partial depth from a working surface of the body to render the first region substantially free of the catalyst material, wherein a remaining second region of the diamond body retains the catalyst material; and
   wherein the diamond body has a diamond content of at least 93 percent by volume, and diamond grains in the diamond body have a majority volume content of greater than about 0.03 mm and have a minority volume content of between about 0.02 mm to 0.2 µm, and wherein the substrate is used to attach the cutting element to an end-use tool.

9. The method as recited in claim 8 wherein the step of joining takes place during the step of sintering.

10. The method as recited in claim 8 wherein the partial depth is in the range of from about 0.01 to 0.08 mm.

11. The method as recited in claim 10 wherein the step of subjecting takes place at a temperature between about 1,200 and 1,500° C.

12. The method as recited in claim 8 wherein during the step of treating, the depth of the first region is less than about 0.08 mm.

13. The method as recited in claim 8 wherein the majority content of the diamond grains used to form the body have an average particle size of between about 0.05 mm to 0.1 mm.

14. The method as recited in claim 8 wherein the partial depth extends from about 0.02 to 0.05 mm from the working surface.

15. A method for making a bit for drilling earthen formations comprising attaching a number of the polycrystalline diamond cutting elements made according to claim 8 by the substrate to a portion of a drill bit to engage an earthen formation.

16. A method for making a bit for drilling an earthen formation comprising;
- heating a volume of diamond grains in a vacuum environment to a temperature of from about 1,200 to 1,500° C. to form graphite thereon;
- subjecting the volume of diamond grains comprising the graphite to a high pressure/high temperature condition in the presence of a substrate comprising a catalyst material to form a fully-sintered polycrystalline diamond body by infiltrating the catalyst material from the substrate into the diamond volume and attaching the substrate directly to the polycrystalline diamond body during the high pressure/high temperature condition;
- treating a first region of the diamond body extending a partial depth from a body working surface to render the first region substantially free of the catalyst material, wherein the catalyst material remains in an untreated second region of the diamond body; and
- attaching the substrate of the polycrystalline diamond cutting element to a portion of the bit to engage an earthen formation during a drilling operation;
- wherein the diamond body has a diamond volume content of at least 93 percent, and diamond grains in the diamond body have a majority volume content of greater than about 0.03 mm and have a minority volume content of between about 0.02 mm to 0.2 µm.

17. The method as recited in claim 16 wherein the bit comprises a number of blades extending from a bit body, and wherein during the step of attaching the polycrystalline diamond cutting element is attached to one of the blades.

* * * * *